United States Patent Office 3,389,099
Patented June 18, 1968

3,389,099
ULTRAVIOLET LIGHT STABILIZERS FOR
PLASTIC MATERIALS
Hans Dressler, Pitcairn, and Kenneth G. Reabe, Delmont,
Pa., assignors to Koppers Company, Inc., a corporation
of Delaware
No Drawing. Filed Feb. 23, 1966, Ser. No. 529,239
4 Claims. (Cl. 260—8.65)

This invention relates to ultraviolet light stabilizers for plastics. In one specific aspect it relates to plastic compositions stabilized against degradation resulting from exposure to ultraviolet radiation.

It is well known that many plastic materials tend to undergo deterioration upon exposure to ultraviolet radiation. Light having wave lengths of about 290–400 millimicrons causes photocatalyzed changes, such as yellowing or embrittlement, in unstabilized polymers. This is particularly undesirable for colorless, translucent, and transparent plastics which are required to withstand long exposure to sunlight. To overcome this problem it is usually necessary to stabilize plastics, such as for use in translucent roofing, transparent structures, protective coatings, impact-resistant windows, and decorative structures, which are subject to prolonged exposure to ultraviolet radiation.

In recent years organic compounds have become available which can absorb ultraviolet light and convert it to less harmful forms of energy, such as heat, vibrational energy, or less harmful radiation. These organic stabilizers, in addition to absorbing ultraviolet radiation in the selected range for the plastic material being treated, must be compatible with the plastic, have little or no initial color, be reasonably inexpensive, be chemically stable, and have a low toxicity, especially for stabilizing plastics used in the food industry.

As a general rule, an effective ultraviolet light stabilizer should have a molar extinction coefficient ($\epsilon$) of about 10,000; that is, the log $\epsilon$ of the molar extinction coefficient is equal to or greater than 4.0 in the 300–400 millimicron spectral region to have potential value as an ultraviolet light stabilizer for plastics. However, individual plastics are generally most susceptible to deterioration by radiation of particular wave lengths. Thus, polyethylene and polystyrene are susceptible to radiation having a wave length of 300–320 millimicrons, while polypropylene is most sensitive to radiation at 370 millimicrons. One disadvantage of presently available commercial stabilizers is that their extinction coefficient is too low over a broad band in the ultraviolet light region to be effective for general use.

Quite surprisingly, we have discovered that di-(3-hydroxy-4-benzoylphenyl) phenylphosphinate is compatible with a large number of plastic materials and exhibits outstanding ultraviolet light absorbing properties over a wide range. The compound does not impart any substantial color to transparent, colorless plastics.

It is therefore an object of the present invention to provide a composition which is resistant to degradation by ultraviolet radiation.

It is another object of the present invention to provide plastic compositions containing di-(3-hydroxy-4-benzoylphenyl) phenylphosphinate which are substantially resistant to ultraviolet deterioration.

In accordance with the present invention, we have discovered that di-(3-hydroxy-4-benzoylphenyl) phenylphosphinate which has the following formula:

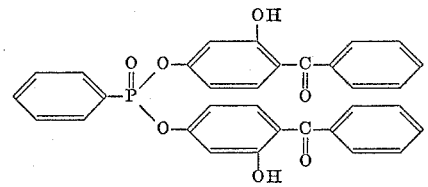

is particularly useful as an ultraviolet light stabilizing agent for plastic materials.

The ultraviolet light stabilizer of the present invention can be readily incorporated into the plastic material by various standard procedures. In one technique the dry stabilizer in powdered form is mixed with a powdered or granular plastic and the mixture is then appropriately treated by molding or extruding. In another procedure an aqueous suspension or emulsion of finely divided polymeric material may be admixed with a suspension or emulsion of the stabilizing agent. Alternatively, it is possible to spray or mix a polymeric material in powdered or granular form with a solution or dispersion of the ultraviolet light-absorbing agent in an appropriate solvent, such as hexane or benzene. It is also possible to incorporate the ultraviolet light-absorbing agent in a finished article by introducing the plastic material into a bath containing the ultraviolet light-absorbing agent in an appropriate liquid solvent and permitting the plastic material to remain in the bath for some time until the plastic has been properly treated. Thereafter, the material is dried to remove any of the remaining solvent. Plastic material in the form of fibers and films may also be sprayed with a solution or suspension of the agent absorbing ultraviolet rays in a solvent or dispersant by any standard technique. In this connection it should be noted that the stabilizer has a good range of solubility, rendering it compatible with a larger number of polymers.

The plastic material should contain a stabilizing amount of the ultraviolet light-absorbing agent; that is, the amount of stabilizing agent sufficient to prevent deterioration and embrittlement of the plastic material. The amount of stabilizing agent to be used will depend to a large extent upon the amount of exposure to which plastic is subjected and the nature of the plastic to be treated. The agent is generally added in an amount of between 0.01 and 5 percent by weight of the plastic material and preferably between 0.1 and 4 percent by weight. The stabilizer has a higher molecular weight than many prior art stabilizers rendering it less volatile and migratory which is highly advantageous at high fabrication temperatures.

The stabilizing agent imparts protection against ultraviolet radiation to numerous plastic materials which are sensitive to ultraviolet light. These include, for example, clear films made of polyester resins, polyvinyl chloride, and cellulose acetate, which are used in packaging dyed textile articles and automobile seat covers. The agent also protects flame-resistant, halogen-containing polyesters and styrene-modified maleate glycol resins used in the preparation of glass fiber-reinforced structural panels which are subject to discoloration on outdoor exposure. The ultraviolet stabilizer is effective for protecting polyethylene, polypropylene, polystyrene, polyvinyl acetate, polyvinyl chloride, copolymers of vinyl chloride and vinylidene chloride, cellulose resins, such as nitrocellulose, ethylcellulose, and cellulose acetate, and numerous other materials. The agent can be used alone or together with other additives, such as fillers, antioxidants, pigments, etc.

The invention is further illustrated by the following examples:

Example I

To a stirred solution of 21.4 grams (0.1 mole) of 4-benzoylresorcinol in 100 ml. of toluene and 8.0 grams (0.1 mole) of pyridine was added dropwise, during 30 min. a solution of 10 grams (0.05 mole) of dichlorophenylphosphine oxide in 30 ml. of toluene. The light yellow slurry was stirred at 80° C. for 1.5 hours, then cooled to 25° C. and filtered. The cake was washed with toluene and after drying, 10.5 grams of colorless solids presumed to be pyridine hydrochloride (91% yield) was obtained. The filtrate was evaporated to dryness, then treated with activated charcoal in hot xylene solution, filtered, and evaporated to dryness to leave 27.4 grams of a pale yellowish viscous resin. The IR spectrum of the product confirmed it to be di-(3-hydroxy-4-benzoylphenyl) phenylphosphinate.

The product is an excellent UV light stabilizer. It has a molar extinction coefficient of log $\epsilon$ equal to or greater than 4.0 in the spectral range of 270–335 millimicrons.

Example II

The product of Example I, di-(3-hydroxy-4-benzoylphenyl) phenylphosphinate, was tested to determine its ability to stabilize polystyrene against ultraviolet light degradation. The stabilizer in an amount of 0.1 part by weight was blended with 100 parts of polystyrene beads by rolling in a jar mill. The stabilized bead samples and a control sample were extruded into pellets from which discs two inches in diameter and ⅛-inch thick were molded by injection molding. These molded discs were then exposed to ultraviolet radiation under a 325-watt Hanovia lamp for 120 hours. A Yellowness Index, which represents the relative degree of yellow coloration based upon spectrophotometric analysis, was determined for the samples of each of the compositions. The difference in the Yellowness Index before and after exposure or the amount of discoloration caused by the ultraviolet radiation is designated as the "Yellowness Factor." Results of the test are given in the table below:

TABLE I

| Stabilizer | Weight Percent | Yellowness Factor |
| --- | --- | --- |
| Di-(3-hydroxy-4-benzoylphenyl) phenylphosphinate | 0.1 | 1.3 |
| Control | None | 5.6 |

Similar results are obtained when polyethylene, polypropylene, and copolymers of vinylidene chloride and vinylchloride are used in the foregoing example.

Example III

Two polyester test specimens were made from self-extinguishing polyester formulations using seventy parts by weight maleic anhydride-tetrachlorophthalic anhydride-propylene glycol polyester resin, thirty parts by weight styrene, and one percent benzoyl peroxide. In addition, one of the specimens contained 0.5 percent by weight di-(3-hydroxy-4-benzoylphenyl) phenylphosphinate. Clear castings were cured at 60–150° C. After one hundred twenty hours irradiation in a Fade-Ometer at a back panel temperature of 120° F. the tested specimen showed a yellowness factor of 4.31, in marked contrast with the control of 54.7. Furthermore it was noted that the phosphorous-containing stabilizer acted as a synergist in contributing to the self-extinguishing properties of the polyesters.

We claim:

1. A polymeric composition stabilized against ultraviolet degradation comprising a polymer selected from the group consisting of polyethylene, polypropylene, polystyrene, polyvinyl acetate, polyvinyl chloride, copolymers of vinylidene chloride and vinyl chloride, nitrocellulose, ethyl cellulose, cellulose acetate, and polyester resins having incorporated therein a stabilizing amount of a stabilizer having the formula:

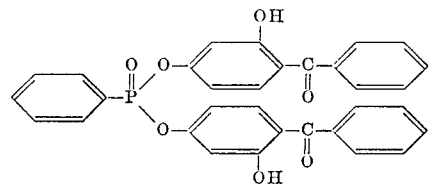

2. The polymeric composition of claim 1 wherein the amount of stabilizer is 0.01 to 5 percent by weight of said polymer.

3. The polymeric composition of claim 1 wherein the polymer is polystyrene.

4. The polymeric composition of claim 1 wherein the polymer is a styrene-modified polyester resin.

References Cited

UNITED STATES PATENTS 2,372,358  3/1945  Cook et al.
2,329,436  9/1943  Cook et al.

DONALD E. CZAJA, *Primary Examiner.*

H. E. TAYLOR, *Assistant Examiner.*